2,725,360
PREPARATION OF ACTIVATED CARBON

Warren K. Lewis, Newton, and Arthur B. Metzner, Boston, Mass., assignors to Esso Research and Engineering Company, a corporation of Delaware No Drawing. Application June 23, 1951,
Serial No. 233,247

3 Claims. (Cl. 252—445)

This invention relates to the preparation of an activated carbon suitable as a gas adsorbent. Specifically the process involved in the activation includes the treatment of a carbonaceous distillation product with sulfur vapor followed by contacting the sulfur-treated carbon with a gas, preferably a hydrogen-containing gas to remove sulfur therefrom.

Prior art processes for the activation of carbon involve treatment of the carbon, for example, charcoal, coke, etc. with steam, $CO_2$, nitrogen, etc. in order to alter the pore structure of the carbon to the point where it will function as an adsorbent. All known methods of activation (improvement of adsorptive capacity for gases) of chars are accompanied by selective reduction in the hydrogen content of the chars, that is, by reduction in the ratio of hydrogen to carbon. Consequently, this reduction is generally considered as an essential prerequisite to successful activation. An ideal activated carbon, therefore, would be one entirely free of hydrogen.

It is an object of this invention to provide a new process for the preparation of an activated carbon suitable as a gas adsorbent. It is another object of this invention to provide an activation process whereby the activated carbon is recovered in high yields based on the original carbon material.

According to the invention the above objects are carried out by treating a carbonaceous distillation product, for example, wood charcoal, nut charcoal, petroleum coke or coke from coal distillation, etc. with sulfur vapor at a temperature in the range of incipient carbon bisulfide formation temperatures, as will be explained later, to produce a solid carbon-sulfur complex and thereafter removing the sulfur from the char by contacting the carbon-sulfur complex with a gas, preferably a hydrogen-containing gas, and more preferably with pure hydrogen, to remove the sulfur therefrom by converting it to a volatile form. The temperature of incipient carbon bisulfide formation will vary with the carbonaceous material being treated. This temperature can very easily be determined experimentally by detecting the odor of carbon bisulfide produced in the gases resulting from the activation. For a wood charcoal prepared by distilling birch chips at temperatures around 450° C., a temperature in the range of 450° C. to 650° C., preferably 500° C. to 600° C. is suitable for the sulfur treating temperature. Treatment of the carbon-sulfur complex with hydrogen is then carried out at a temperature 300° to 400° C. higher than the temperature of sulfur vapor treatment, i. e. in the neighborhood of 750° C. to 1050° C., preferably 800° C. to 900° C.

Different forms of carbon differ very greatly in chemical activity. Thus, at identical temperatures and partial pressures of sulfur vapor, the reaction rate of various raw carbons to form carbon bisulfide differ by over a hundredfold. When considering the reaction rate of carbon at a given temperature level, it is imperative, therefore, to know the type of carbon with which one is dealing. Any data obtained on a particular single specific type of carbon may not apply to another carbon of similar source. For example, wood charcoal may exhibit activity towards sulfur vapor at a given temperature which activity is not displayed by another form of charcoal. However, carbons which are reasonably similar in general character, including hydrogen content and reactivity, respond to sulfur activation to produce highly active carbon products upon desulfurization. However, cokes which are far less reactive to sulfur vapor than wood charcoal also respond less satisfactorily to the activation treatment. While the absolute levels of temperature at which sulfur treatment of the carbons are most advantageously carried out will vary from char to char, they can be easily determined experimentally for any specific carbon. In determining the temperature therefore at which the sulfur vapor treatment should be carried out one may use the incipient carbon bisulfide temperature as significant. The temperature range of incipient carbon bisulfide formation is defined as the range between that temperature at which carbon bisulfide formation becomes first readily detectable and the temperature, about 100–150° C. higher than that incipient temperature, at which the rate of formation of carbon bisulfide becomes considerable, say about 3 to 12% per hour. The range of incipient carbon bisulfide formation for birch charcoal (i. e. charcoal recovered from the distillation of birch chips) is from about 450° C. to 650° C. The preferable temperature of sulfur treatment lies in the upper half to upper third of this range. At this temperature level the removal of hydrogen is accomplished rapidly and yet very little carbon is wasted as bisulfide. Meanwhile, while the actual numerical values of the desired temperature for sulfur activation will change somewhat from carbon to carbon, this upper half to upper third of the incipient carbon bisulfide formation range always remains the desirable region for sulfur treatment.

The effect of partial pressure of the sulfur vapor during the treatment is relatively small. While higher at the start of the treatment, it falls off so much that a pressure variation of over eightfold makes less than 50% difference in hydrogen removal rate at the end of the treatment.

At a temperature range from 300° C. to 400° C. above the incipient carbon bisulfide formation range above defined one will encounter a temperature range in which desulfurization of the sulfurized char with hydrogen will be rapid and most effective in producing a highly active carbon of low sulfur content at high yields. Somewhere in this range lies an optimum temperature for sulfur removal above and below which more sulfur will always be left in the product. On the other hand this optimum represents a fairly flat section of the curve so that operation in the neighborhood is satisfactory.

When treating birch charcoal with sulfur it is found that the dehydrogenation becomes rapid only at temperatures of about 450° C. and further, that, while as temperature rises the initial dehydrogenation rate increases at temperatures of 500° C. and above to 650° C., the dehydrogenation curve flattens off to asymptotic values in the neighborhood of 1% on the carbon. Consequently, from the point of view of hydrogen removal temperature treatments above 650° C. for this char offer very little advantage. Carbon bisulfide formation which involves loss of carbon and waste of sulfur was undetectable below 450° C. Even at 500° C. less than 6% of the carbon was gasified as carbon bisulfide in three hours and twenty minutes of exposure to sulfur. At 600° C. and above, however, the rate of carbon bisulfide formation begins to rise appreciably especially when the treatment is prolonged. It is clear therefore that in order to get rid of the hydrogen in the original charcoal at a practical rate and to an adequate degree, temperatures in the range of 500° C. to 600° C. are preferred. It has been observed that the use of temperatures in this range does not significantly increase the amount of sulfur picked up by the carbon and therefore does not involve the necessity of removing larger quantities in the subsequent hydrogen treatment.

For effective treatment of the carbon with sulfur vapor adequate mixing of the carbon and sulfur vapor must be assured. Proper contact of the carbon and the sulfur vapor is carried out most effectively by supporting the carbon in a stream of sulfur vapor under conditions to produce a turbulent mixture. With proper mixing one is permitted to achieve a rapid treatment at a higher temperature at which maximum utilization of the activating vapor is assured. At the higher temperature the rate of reaction is far higher and utilization of the activating vapor is correspondingly higher. In the fixed bed, wherein adequate mixing is less perfectly achieved, it is impossible to employ high temperatures because under these conditions, the activating gas more or less completely burns off the first portion of carbon that it contacts and overactivates the next layer thereto, but leaves the last carbon in its path practically unaffected. The result is a mixture of overtreated and undertreated carbon. Lower temperatures must be employed in a fixed bed with accompanying slow reaction and low utilization of the activating vapor. Taking the same carbon, therefore, and suspending it in the activating vapor under velocities to produce turbulent mixing, it is possible to conduct the treatment at a temperature 150° C. higher and in far shorter time and at higher utilization of activating vapor than is possible in the fixed bed method of activation. The same activation is accomplished without loss and perhaps with a gain in actual yield of carbon. As an alternative to turbulent mixture, other processes where thorough mixing of the solids is maintained is desirable. For example, it is possible to carry out the activation in a rotating cylinder equipped with shelves to mix the carbon which falls down through the gas stream. However, this is a less satisfactory method than turbulent mixing but it does supply the adequate mixing which is essential.

The same comments relative to the necessity of proper mixing apply not only to the contacting of the original carbon with sulfur vapor but also to the contacting of the sulfur-treated carbon with the gas to produce the desulfurization thereof.

During the treatment of the carbonaceous material with sulfur vapor, hydrogen is removed from the carbon with the resulting formation of hydrogen sulfide which is allowed to escape from the treating vessel. Carbon bisulfide which forms once the incipient carbon bisulfide formation temperature is reached of course vaporizes and is removed in the same manner.

The solid product remaining in the treating vessel is a composite of carbon and sulfur and can contain about 30 to 40% and even as high as 50% sulfur. The sulfur may be present physically adsorbed or in some loosely bound chemical complex with the carbon. The sulfur-carbon complex formed by the treatment has an adsorption activity lower than that of the original char. This is due to the fact that the char is loaded up with sulfur which interferes with the adsorption of such gaseous materials as ethylene. To convert this complex to an activated carbon the sulfur must be removed. Its removal can be effected in various ways, for example, by treatment with air or steam, chlorine gas or nitrogen. However, the most successful agent for desulfurization is a hydrogen-containing gas, preferably pure hydrogen. Treatment with air at high temperature selectively removes the sulfur but at a low rate and the char produced still contains an appreciable amount of sulfur, i. e. 6%. Steam is a little better than air, however, the yield of the char is only about 25% based on the complex. Treatment with chlorine removes the sulfur selectively but some chlorine is introduced into the carbon, and the activity is lower. Nitrogen removes the sulfur even less completely than the air.

It is evident therefore that the most successful agent for desulfurizing the complex is hydrogen, the sulfur being removed entirely in the form of hydrogen sulfide.

With a wood charcoal-sulfur complex containing about 40 wt. per cent sulfur, treatment with hydrogen removes the sulfur extremely rapidly in the initial stages of treatment at temperatures above 700° C. At 825° C. and above the hydrogen is converted substantially quantitatively to hydrogen sulfide in the early stages of the run so that hydrogen utilization is high. As the temperature increases, however, sulfur removal rates slow down and an optimum is reached at about 875° C. Ultimate sulfur removal continues to decrease at temperatures up to 925° C. At the higher temperatures it is felt that some form of chemical reaction of the sulfur and carbon is induced which renders the final traces of sulfur resistant to hydrogenation. With this particular charcoal therefore temperatures of the order of 800° C. and above are required but to avoid permanent fixation of too much sulfur on the carbon temperatures above 900° C. are discouraged.

During the desulfurization with hydrogen some hydrogen is picked up by the complex presumably by the carbon of the complex. However, at the optimum desulfurization temperatures recommended only a small amount of hydrogen becomes recombined in the carbon, the total remaining about 1%. Because of the high reactivity of the hydrogen on the sulfur of the complex in the initial stages of the reaction countercurrent flow of the hydrogen over the complex being treated is extremely desirable to reduce hydrogen consumption per unit of product and at the same time secure high activity. In such an operation adequate gas flow and residence time of the carbon must be provided.

It has been found that in a carbon activated by treatment with sulfur followed by hydrogen desulfurization one of the major factors in determining activity or adsorptive capacity of the char for gases is the sulfur content of the product. Highest activities were found when the sulfur content of the chars is maintained below 2 wt. percent, preferably around 1 wt. percent.

The main advantage of the activation treatment described herein lies in the tremendous savings of carbon obtained. In the usual activation methods involving treatment of the carbonaceous material with air and/or steam the usual yield of activated carbon is 25 to 30 wt. percent of the original carbon charged. By the process of this invention yields of 60 to 75 wt. percent were regularly attained even though the technique actually employed resulted in some mechanical loss in the form of solid flow over with the activating gases which can easily be eliminated by proper mechanical design.

The invention is demonstrated by the data contained in the following tables. Table I records the results of treatment of birch wood charcoal with sulfur vapor at atmospheric pressure. Table II records the results obtained by desulfurizing the sulfur-carbon complex by treatment with hydrogen also at atmospheric pressure. The overall yields of finely activated char are based on the original carbonaceous material employed. The adsorptive capacity of the product compares very favorably with that of chars produced by other activation methods from the same raw materials at considerably lower overall yields of activated carbons.

TABLE I

*Treatment of raw charcoal [1] with sulfur vapor (atmospheric pressure)*

| Run No. | 1 | 2 | 3 | 4 | 5 |
|---|---|---|---|---|---|
| Amount of S used (g) | 1,300 | 148 | 1,780 | 970 | 1,320 |
| Temp. of S treat, ° C | 500 | 500 | 500 | 600 | 450 |
| Time of S treat, min | 180 | 266 | 200 | 130 | 300 |
| Yield, percent | 112 | 112 | 122 | 97 | 119 |
| S Content of Prod. (wt. percent) | 40.7 | 29.3 | 40.0 | 32.0 | 29.7 |

[1] Charcoal produced by distilling birch wood chips in $N_2$ at approximately 450° C. for 3-hour periods.

TABLE II

*Treatment of sulfur-treated char with hydrogen*

| Run No. | 1 [b] | 2 [c] | 3 [c] | 4 [d] | 5 [d] | 6 [d] | 7 [d] |
|---|---|---|---|---|---|---|---|
| Amt. of H² (gm. mol/gm.) | 0.014 | 0.035 | 0.057 | 0.13 | 0.20 | 0.014 | 0.13 |
| Temp. of Treat, °C | 825 | 875 | 825 | 875 | 825 | 925 | 925 |
| Time of Treat, min | 30 | 75 | 120 | 300 | 430 | 30 | 300 |
| Overall Yield, wt. percent | 55 | 73 | 67 | 60 | 61 | 75 | 67 |
| S Cont. of Prod | 2.20 | 1.42 | 1.50 | 1.15 | 1.42 | 1.98 | 1.93 |
| Ads. Cap. of Prod.[a] | 2.54 | 2.42 | 2.41 | 2.68 | 2.43 | 2.46 | 2.53 |

[a] Adsorptive capacity of ethylene measured at 25° C. and 700 mm.
[b] Product from Run No. 1, Table I.
[c] Product from Run No. 2, Table I.
[d] Product from Run No. 3, Table I.

The activation process described herein is applicable to charcoals and cokes regardless of their original source. The carbons may be derived from the distillation of wood, lignite, coal, nut shells, etc. or from such sources as petroleum cokes and petroleum sludges derived from the treatment of hydrocarbon oils with sulfuric acid. Original carbonaceous materials such as wood, lignite, etc. may be treated in any of the well known methods, for example, destructive distillation, to produce an unactivated carbon which is then subjected to treatment according to this invention.

However, the preferred initial raw material is undecayed and unchanged vegetable matter of high density distilled at a low temperature level, preferably below 500° C., and at low partial pressure of the distillation gases (obtained by use of vacuum or by injection of diluent gases), the distillation being conducted under uniform temperature conditions with constant absence of local overheating either in time or space such as is best achieved by active mixing of subdivided raw material during the distillation process.

The treating temperatures when hydrogen is employed have been adequately discussed.

As to the other gaseous agents employed to remove sulfur from the complex the following temperatures were found to be suitable. With air, temperatures in the range of 250° C. to 450° C. were employed, with best results obtained around 350° C. The use of steam produces good results in the range of around 500° C. to 800° C. At 530° C. good selectivity was obtained but a satisfactory carbon was also obtained at 775° C. at which temperature selectivity was lower. Chlorine was successful in removing sulfur at temperatures in the neighborhood of 500° C. In general the more active the gas as a high temperature oxidizing agent, the lower is the temperature at which it should be used for removing sulfur from carbon in the carbon-sulfur complex.

With respect to the qualities of the activated char produced by the method of this invention it has been observed that the sulfur activated carbon after suitable desulfurization has the property of adsorbing $C_2$ and $C_3$ hydrocarbons to a higher degree relative to its adsorption of hydrocarbons of higher molecular weight than ordinary steam-activated commercial carbons even of the highest quality. The difference is particularly great at low pressures of these gaseous hydrocarbons making the carbon extremely desirable therefore for clean-up of these hydrocarbons from dilute gases containing them.

Having described the process in a manner such that it may be practiced by one skilled in the art, what is claimed is:

1. A process for preparing an activated carbon in yields of at least 60% based on the original carbon which comprises contacting a wood charcoal at a temperature of 500° to 600° C. with sufficient sulfur vapor to form a solid carbon-sulfur complex having a sulfur content in the range of 30 to 50 weight percent and thereafter heating said carbon-sulfur complex in an atmosphere of hydrogen at a temperature betwen 800° and 900° C. until the sulfur content of the carbon is reduced below 2 weight percent by conversion of the sulfur into volatile form.

2. A process for preparing an activated carbon in yields of at least 60% based on the original carbon which consists in contacting a birchwood charcoal at a temperature between 500° and 600° C. with sufficient sulfur vapor to form a carbon-sulfur complex having a sulfur content in the range of 30 to 40 weight percent, and thereafter heating said carbon-sulfur complex in a hydrogen atmosphere at a temperature between 800° and 900° C. until the sulfur content of the carbon is reduced below 2 weight percent by conversion of the sulfur into volatile form.

3. A process for preparing activated carbon in yields of about 60% based on the original carbon which consists in contacting birchwood charcoal at a temperature of about 500° C. with sufficient sulfur vapor to form a carbon-sulfur complex having a sulfur content of about 40 weight percent, and thereafter heating said sulfur-carbon complex in a hydrogen atmosphere at a temperature of about 875° C. until the sulfur content of the carbon is reduced to about 1.15 weight percent by conversion of the sulfur into volatile form.

References Cited in the file of this patent

UNITED STATES PATENTS

| | | |
|---|---|---|
| 1,777,943 | Threlfall | Oct. 7, 1930 |
| 1,819,314 | Zurcher | Aug. 18, 1931 |
| 2,234,769 | McCulloch | Mar. 11, 1941 |

OTHER REFERENCES

Dietz: "Bib. of Solid Adsorbents," page 785, 1944.

Hassler, J. W.: "Active Carbon," page 29, copyright 1951, Chemical Publishing Co., N. Y. C.

Wibout, J. P.: "Z. anorg. allgem. Chem.," vol. 211, page 398 (1933).